US011958395B2

(12) United States Patent
Kohlman (10) Patent No.: US 11,958,395 B2
(45) Date of Patent: Apr. 16, 2024

(54) VEHICLE SEAT WITH EMBEDDED INFLATABLE BLADDER SYSTEM

(71) Applicant: Aquila Corporation, Holmen, WI (US)

(72) Inventor: Steven P. Kohlman, Holmen, WI (US)

(*) Notice: Subject to any disclaimer, the term of this patent is extended or adjusted under 35 U.S.C. 154(b) by 50 days.

(21) Appl. No.: 17/581,348

(22) Filed: Jan. 21, 2022

(65) Prior Publication Data
US 2023/0234487 A1 Jul. 27, 2023

(51) Int. Cl.
*B60N 2/90* (2018.01)
*B60N 2/00* (2006.01)
*B60N 2/02* (2006.01)
*B60N 2/66* (2006.01)

(52) U.S. Cl.
CPC ............. *B60N 2/914* (2018.02); *B60N 2/002* (2013.01); *B60N 2/0244* (2013.01); *B60N 2/665* (2015.04)

(58) Field of Classification Search
CPC ........ B60N 2/914; B60N 2/665; B60N 2/002; B60N 2/0244; B60N 2/976
See application file for complete search history.

(56) References Cited

U.S. PATENT DOCUMENTS

| | | |
|---|---|---|
| 6,216,299 B1 | 4/2001 | Kohlman |
| 6,668,405 B1 | 12/2003 | Kohlman |
| 6,898,135 B2 | 5/2005 | Asano et al. |
| 7,322,651 B2 | 1/2008 | Makhsous et al. |
| 7,392,557 B1 | 7/2008 | Kohlman |
| 7,455,355 B1 | 11/2008 | Kohlman |
| 8,181,292 B1 | 5/2012 | Pellettiere |
| 8,275,514 B2 | 9/2012 | Hwang et al. |
| 8,794,707 B2 | 8/2014 | Bocsanyi et al. |
| 8,944,504 B2 | 2/2015 | Zimmerman, II |
| 9,211,824 B2 | 12/2015 | Arant et al. |
| 9,579,998 B2 | 2/2017 | Hall et al. |
| 9,802,521 B2 | 10/2017 | Ferretti et al. |
| 9,809,132 B2 | 11/2017 | Bortolon et al. |
| 9,840,171 B2 | 12/2017 | Arant et al. |
| 9,937,826 B2 | 4/2018 | Dry |
| 9,949,568 B2 | 4/2018 | Zouzal et al. |
| 10,046,671 B2 | 8/2018 | Seiller et al. |
| 10,046,679 B2 | 8/2018 | Byun et al. |
| 10,059,239 B2 | 8/2018 | Jaranson et al. |

(Continued)

FOREIGN PATENT DOCUMENTS

JP 2005125846 A 5/2005

*Primary Examiner* — Syed A Islam
(74) *Attorney, Agent, or Firm* — Melissa L. Kleine (57) ABSTRACT

A vehicle seat assembly is provided. The vehicle seat assembly includes multiple inflatable bladders embedded below a seating surface of a seat cushion portion. The inflatable bladders includes a first group and a second group, each of the first group and the second group having at least one of the inflatable bladders. The vehicle seat assembly further comprises a control system operably coupled to the inflatable bladders. The control system is configured to operate a bladder pump to inflate the first group of inflatable bladders to a target pressure, operate a valve coupled to the second group of inflatable bladders to deflate the second group, and upon expiration of a dwell period, operate the bladder pump to inflate the second group of inflatable bladders to the target pressure and operate a valve coupled to the first group of inflatable bladders to deflate the first group.

13 Claims, 7 Drawing Sheets

(56) References Cited

U.S. PATENT DOCUMENTS

| | | | |
|---|---|---|---|
| 10,065,534 B1 | 9/2018 | Line et al. | |
| 10,085,565 B2 | 10/2018 | Zouzal et al. | |
| 10,086,731 B2 | 10/2018 | Hall et al. | |
| 10,214,129 B2 | 2/2019 | Jaranson et al. | |
| 10,363,852 B2 | 7/2019 | Strumolo et al. | |
| 10,406,939 B2 | 9/2019 | Shibata et al. | |
| 10,744,920 B2 | 8/2020 | Strumolo et al. | |
| 2011/0025111 A1 | 2/2011 | Wornell et al. | |
| 2016/0207429 A1 | 7/2016 | Fitzpatrick et al. | |
| 2017/0282762 A1* | 10/2017 | Klieber | B60N 2/0228 |
| 2018/0325264 A1* | 11/2018 | Gallagher | B60N 2/5685 |
| 2019/0031057 A1 | 1/2019 | Boccuccia et al. | |
| 2019/0031058 A1 | 1/2019 | Boccuccia et al. | |
| 2019/0299831 A1* | 10/2019 | Rosero | B60N 2/976 |
| 2020/0390641 A1* | 12/2020 | Arthurs | A61H 9/0078 |
| 2021/0059426 A1* | 3/2021 | Bussert | A47C 7/142 |
| 2022/0212578 A1* | 7/2022 | Roulund | B60N 2/665 |

* cited by examiner

VEHICLE SEAT WITH EMBEDDED INFLATABLE BLADDER SYSTEM

FIELD

The present disclosure generally relates to vehicle seats, and more specifically to a vehicle seat with an embedded inflatable bladder system that sequentially inflates and deflates the bladders to relieve sitting pain.

BACKGROUND

Many occupations, most notably over the road (OTR) drivers, require long periods of sitting with little to no opportunity to take standing breaks. Prolonged sitting can lead to decreased employee morale and productivity, as well as increased health care costs due to a variety of associated health conditions, including pressure sores, sciatica pain, and hemorrhoids. These conditions, as well as other pain during sitting, are caused by the compression of tissue as body weight presses down under the sitting bones, restricting blood flow to skin and tissue in a process known as capillary occlusion.

Existing products have attempted to alleviate capillary occlusion through the use of cushions intended to be placed atop existing vehicle seats. However, these devices can slide around on vehicle seats and thus present safety concerns. Because they are not integrated into the existing vehicle seat, they can also be cumbersome and unattractive. A pressure-relieving vehicle seat system that does not present these drawbacks would therefore be useful.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one exemplary implementation of the present disclosure, a vehicle seat assembly is provided. The vehicle seat assembly includes multiple inflatable bladders embedded below a seating surface of a seat cushion portion. The inflatable bladders includes a first group and a second group, each of the first group and the second group having at least one of the inflatable bladders. The vehicle seat assembly further comprises a control system operably coupled to the inflatable bladders. The control system is configured to operate a bladder pump to inflate the first group of inflatable bladders to a target pressure, operate a valve coupled to the second group of inflatable bladders to deflate the second group, and upon expiration of a dwell period, operate the bladder pump to inflate the second group of inflatable bladders to the target pressure and operate a valve coupled to the first group of inflatable bladders to deflate the first group.

In another exemplary implementation of the present disclosure, a method of operating a vehicle seat assembly is provided. The method includes providing multiple inflatable bladders embedded below a seating surface of a seat cushion portion of the vehicle seat assembly. The inflatable bladders includes a first group of inflatable bladders and a second group of inflatable bladders, and each of the first group and the second group includes at least one inflatable bladder. The method further includes operating a bladder pump to inflate the first group of inflatable bladders to a target pressure, operating a valve coupled to the second group of inflatable bladders to deflate the second group of inflatable bladders, and upon expiration of a dwell period, operating the bladder pump to inflate the second group of inflatable bladders to the target pressure and operating a valve coupled to the first group of inflatable bladders to deflate the first group of inflatable bladders.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
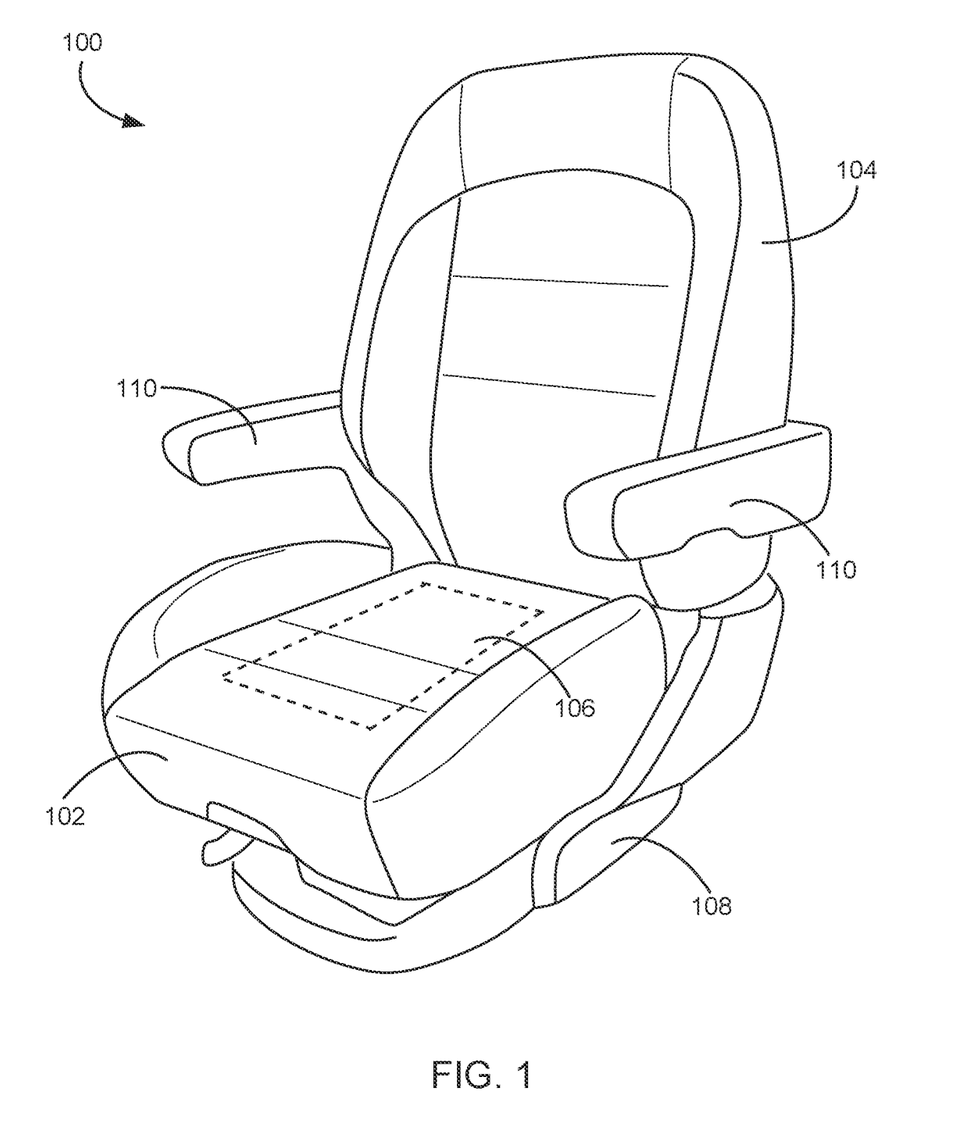
FIG. 1 is a front perspective view of a vehicle seat assembly with an integrated inflatable bladder system according to an exemplary implementation of the present disclosure.
Figure 2:
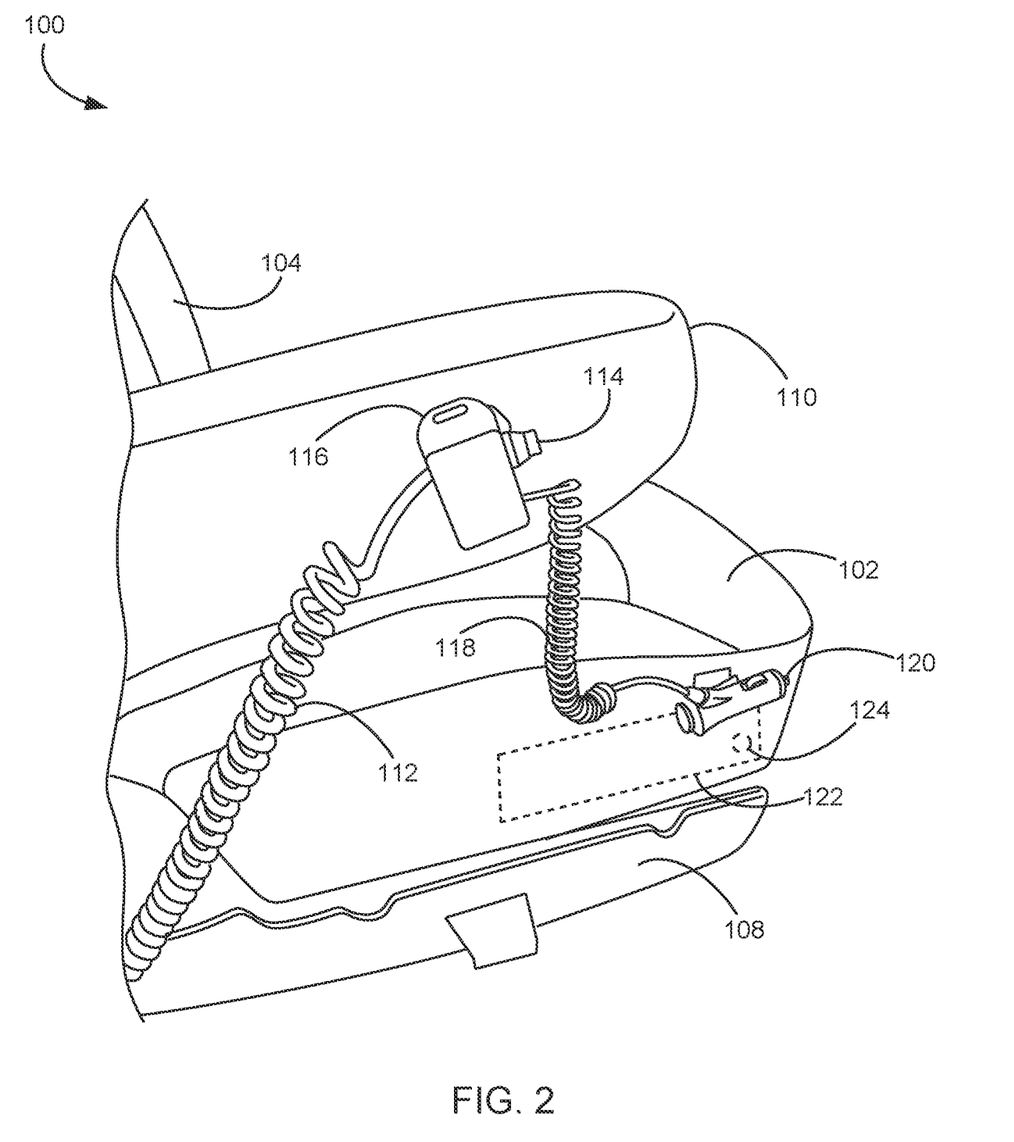
FIG. 2 is a side view of the vehicle seat of FIG. 1.
Figure 3:
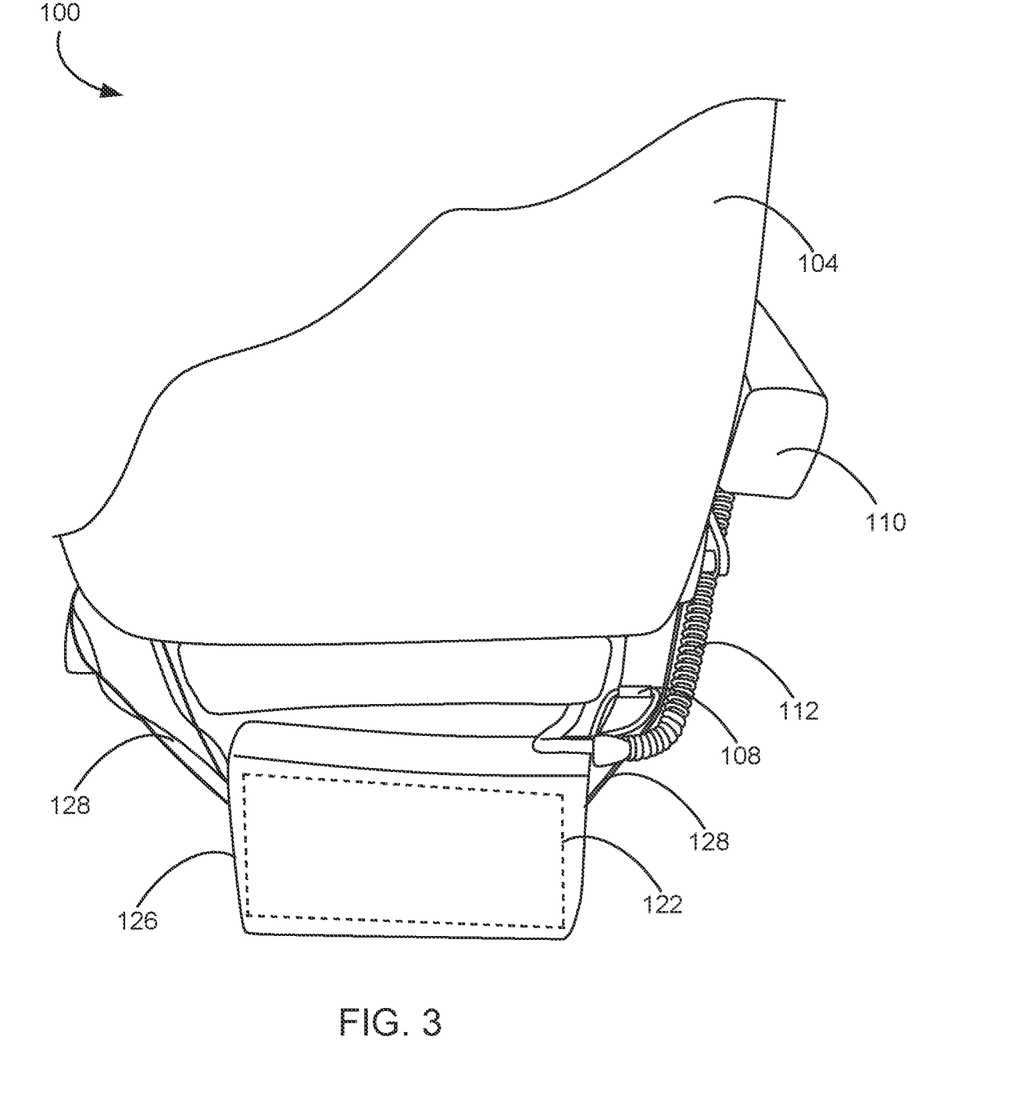
FIG. 3 is a rear view of the vehicle seat of FIG. 1.

FIGS. 1-3 depict a vehicle seat assembly 100 according to an exemplary implementation of the present disclosure. The assembly 100 is shown to include a seat cushion portion 102 and a backrest portion 104. An air bladder system 106 intended to alleviate the pain of sitting for long periods (described in further detail below with reference to FIG. 6) is shown to be embedded within a central region of the seat cushion portion 102. The vehicle seat assembly 100 is further shown to include a frame assembly 108 that is utilized to couple the seat assembly 100 to the vehicle, and a pair of arm rests 110 that extend from the backrest portion 104. In an exemplary implementation, the vehicle seat assembly 100 is installed in a truck utilized by an OTR driver. However, the teachings of the present disclosure are not particularly limited and may be incorporated into any type of vehicle (e.g., cars, vans, trucks, marine vessels, aircraft) for which the vehicle's occupants are required to sit for long periods.

Turning now to FIGS. 2 and 3, various aspects of the control and power systems of the air bladder system 106 are depicted. The present inventor has recognized multiple potential installation locations for a control assembly 122 that contains the components (e.g., processors, pump, valves) utilized to operate the inflation of the bladders. Referring specifically to FIG. 2, in one implementation, the control assembly 122 is embedded within the seat cushion portion 102 of the vehicle seat 102. As depicted in FIG. 3, in other implementations, the control assembly 122 may be located within a protective enclosure 126 (e.g., a fabric or plastic bag) that hangs to the rear of the seat cushion portion 102 and the backrest portion 104 from a pair of straps 128 that are secured to various structural components of the frame assembly 108. In further implementations, the control assembly 122 in its protective enclosure 126 may be secured below the seat cushion portion 102.

Still referring to FIGS. 2 and 3, for the implementations in which the control assembly 122 is not embedded within the seat cushion portion 102, a power and signal cable 112 is shown to extend externally from the control assembly 122, and a firmness actuation button 114 is shown to be coupled to the power and signal cable 112. The firmness actuation button 114 may be secured to one of the vehicle arm rests 110 using a mounting bracket enclosure 116 such that the button is easily accessible to a user sitting on the vehicle seat assembly 100. Conversely, for the implementation in which the control assembly 122 is embedded in the seat cushion portion 102, a firmness actuation button 124 may be located behind a side surface of the seat cushion portion 102 and actuatable through an upholstery used to cover the seat cushion portion 102. In all of the control assembly 122 installation locations, the firmness actuation button 114, 124 may be utilized by a user to select a desired firmness (i.e., an inflation level) of the air bladders of the air bladder system 106. Pressing the firmness actuation button 114 or 124 once may prompt an audible indicator that is located either within the firmness actuation button 114 or the control assembly 122 to provide an audible indication of the current selected firmness level. For example, one beep may correspond to a soft firmness level, two beeps may correspond to a medium firmness level, and three beeps may correspond to a hard firmness level. To toggle between the firmness levels, the user may continue to actuate the button 114 or 124 within a specified time period of the initial button push (e.g., three seconds), until the desired firmness level is achieved as indicated by the number of indications (e.g., beeps) emitted by the audible indicator.

Power may be supplied to the air bladder system 106 via a DC plug connector 120 (see FIG. 2) which is compatible with a standard 12 V auxiliary vehicle power outlet (i.e., a cigarette lighter socket). The plug connector 120 may be coupled to the power and signal cable 112 via a power cable 118 that is coupled to the power and signal cable 112 within the mounting bracket enclosure 116, if present. If the control assembly 122 is embedded within the seat cushion portion 102, the power cable 118 may protrude from a corner seam in the upholstery of the seat cushion portion 102. In some implementations, the plug connector 120 includes a master power switch that may be utilized to turn the operation of the air bladder system 106 on or off. Alternatively, a user could simply disconnect the plug connector 120 from the vehicle socket to turn off the operation of the air bladder system 106.

Figure 4:
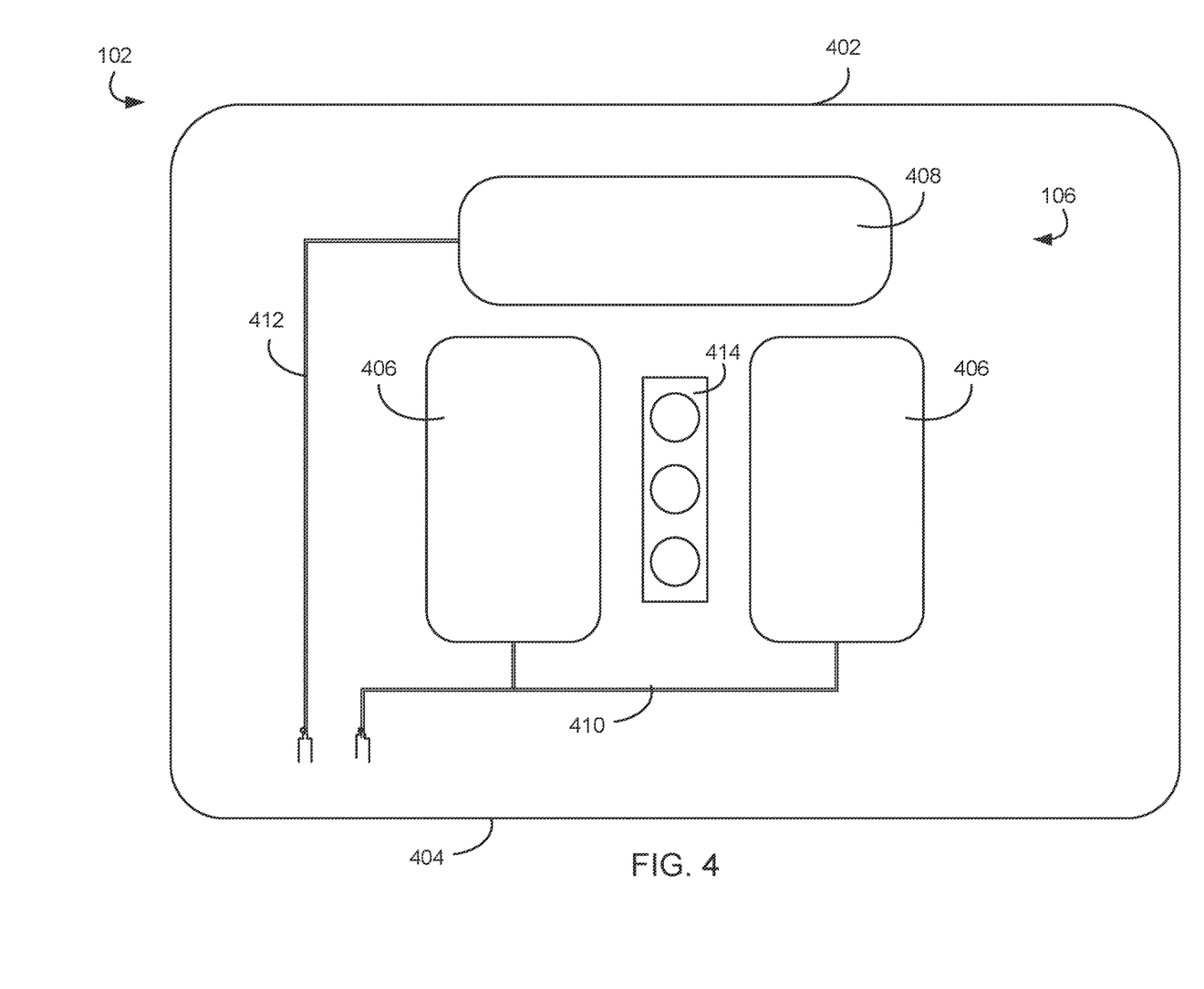
FIG. 4 is a block diagram of a bladder system that may be utilized in the vehicle seat of FIG. 1.

Referring now to FIG. 4, a block diagram of an exemplary bladder system 106 that is embedded within the seat cushion 102 is provided. As shown, the bladder system 106 includes three separate bladders positioned between a rear surface 402 and a front surface 404 of the seat cushion 102. Specifically, the system 106 includes two bladders 406 that are configured to support the ischial region of a user's spine when the user is seated on the seat cushion 102, and one bladder 408 that is configured to support the sacral region of a user's spine when the user is seated on the seat cushion 102. Accordingly, the bladders 406, 408 will herein be referred to as ischial bladders 406 and sacral bladder 408. In other implementations, the bladder system 106 may include a different number of bladders, and the bladders may have different installation locations. For example, in some implementations, instead of two ischial bladders 406, one bladder that is large enough to span both ischial bones of a user's spin may be utilized.

Each of the bladders 406, 408 may be fabricated from a flexible polymer (e.g., polyurethane) and may be generally shaped like a rectangular prism when inflated, although other bladder shapes (e.g., cylinders) are contemplated and within the scope of the present disclosure. In an exemplary implementation, each of the bladders 406, 408 is enclosed within a non-expandable sleeve fabricated from a poly tube or nylon material that functions as a safety feature by preventing the over-inflation of the bladders 406, 408 in the event of a control system malfunction.

Air supplied by a pump (e.g., bladder pump 616, described below with reference to FIG. 6) may reach the ischial bladders 406 and the sacral bladder 408 via air hoses 410 and 412 respectively. As shown, hose 410 supplying the ischial bladders 406 may include a first branch and a second branch such that both ischial bladders 406 may be inflated and deflated simultaneously. In an exemplary implementation, the air hoses 410 and 412 are fabricated form PVC tubing having a ⅛" inner diameter. As described in further detail below, a valve system within the control assembly 122 may selectively connect the air supplied by the pump to either the ischial bladders air hose 410 or the sacral bladder air hose 412 such that all three bladders 406, 408 are not inflated simultaneously. Rather, the ischial bladders 406 are intended to be inflated while the sacral bladder 408 is deflated and vice versa, thereby varying the compression experienced by a user sitting on the seat cushion 102 and preventing capillary occlusion.

A user presence sensor assembly 414 is shown to be positioned between and spaced apart from the ischial bladders 406 and sacral bladder 408 such that inflation of the bladders 406, 408 does not affect the performance of the sensor assembly 414. In an exemplary implementation, the sensor assembly 414 includes multiple pressure sensors. When a user sits on the seat cushion portion 102, the presence sensor assembly 414 generates a signal that causes a controller (e.g., inflation controller 606, depicted in FIG. 6) to command a pump (e.g., bladder pump 616, also depicted in FIG. 6) to supply air to inflate one or more of the bladders 406, 408.

Figure 5:
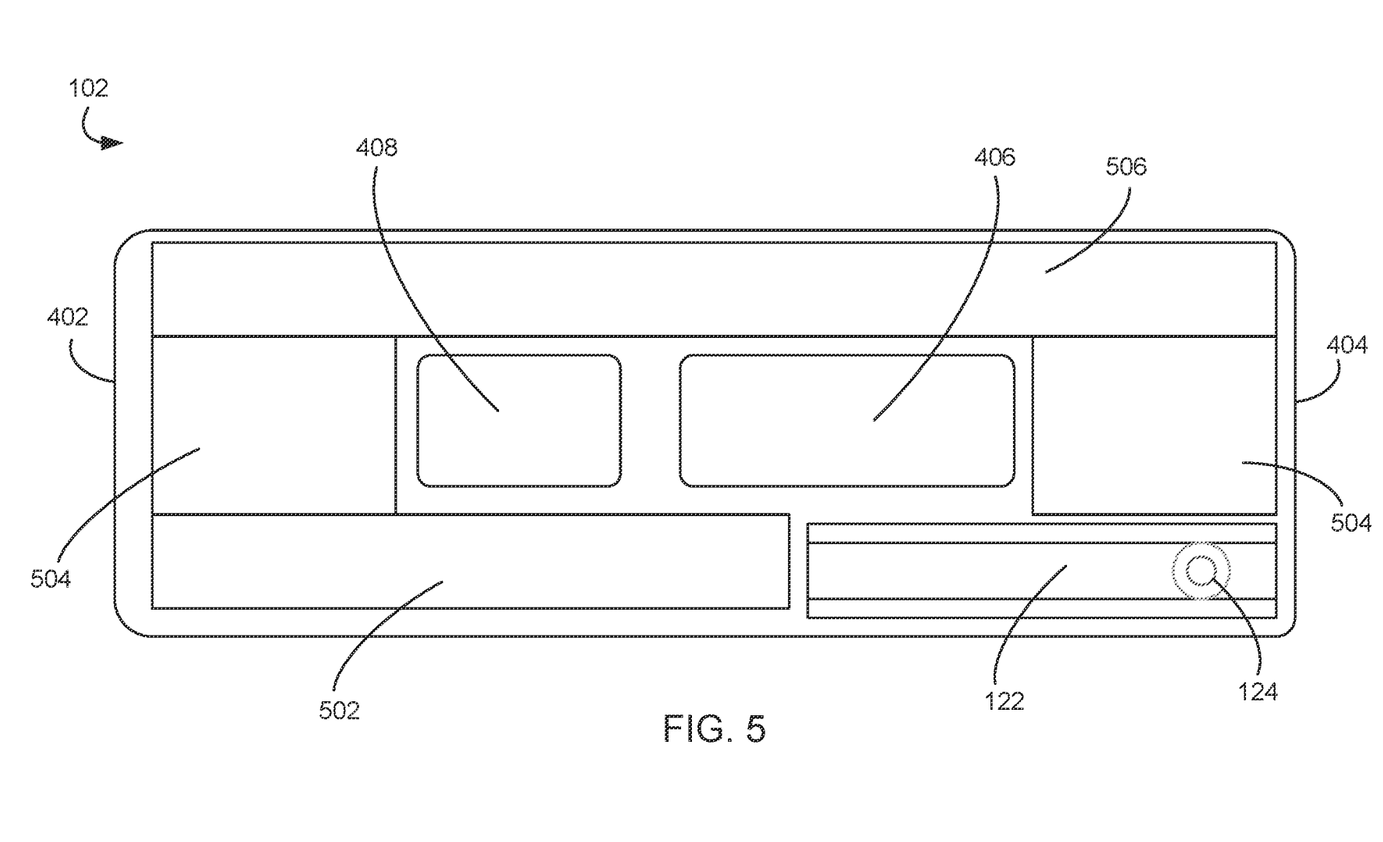
FIG. 5 is a side cross-sectional view of a bladder system and control assembly that may be utilized in the vehicle seat assembly of FIG. 1.

FIG. 5 depicts a side cross-sectional diagram of the bladder system 106 located in the seat cushion portion 102. As shown, the ischial and sacral bladders 406, 408 are centrally located below a seating surface of the seat cushion portion 102, with the ischial bladders 406 positioned closer to the front surface 404 of the cushion portion 102 and the sacral bladder 408 positioned closer to the rear surface 402 of the cushion portion 102. The control assembly 122 with firmness actuation button 124 is shown to be embedded within the cushion 102 near the front surface 404. However, as described above, in other implementations, the control assembly 122 is not embedded within the cushion portion 102, but instead may be suspended from the frame assembly 108 (see FIG. 3) or installed below the cushion portion 102.

Multiple layers of flame-retardant foam cushioning 502, 504, 506 are shown to surround the bladders 406, 408. In an exemplary implementation, the layers 502, 504, 506 have varying densities. For example, a bottom foam layer 502 located beneath the air bladders 406, 408 may have a high density in order to provide adequate structural support for the bladders 406, 408. Middle and upper layers 504, 506 may have a lower density in order to provide a soft seating surface during all phases of bladder inflation and deflation. In some embodiments, foam cushioning may also be located within any or all of the bladders 406, 408.

Figure 6:
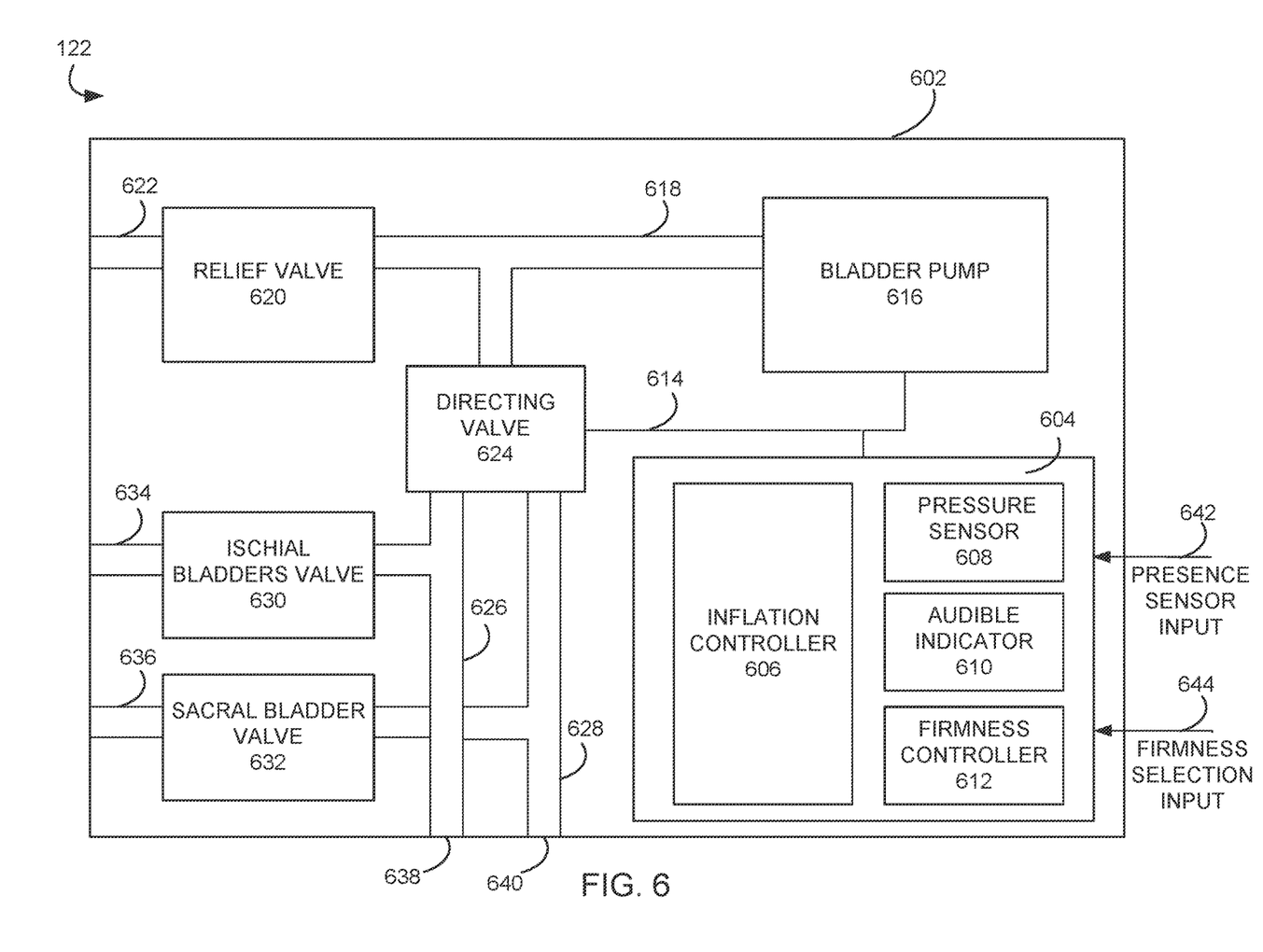
FIG. 6 is a block diagram of the control assembly shown in FIG. 5.

Referring now to FIG. 6, a block diagram of the components comprising the control assembly 122 is shown. These components may include, but are not limited to, a control circuit card assembly (CCA) 604, a bladder pump 616, and multiple valves 620, 624, 630, and 632. These components are housed within an outer enclosure 602 that may be fabricated from metal or plastic, or a combination of materials (e.g., ⅛" thick ABS plastic with aluminum side panels for perimeter strength). As described above, in some implementations, the outer enclosure 602 is embedded within the seat cushion portion 102. In other implementations, the outer enclosure is 602 is located external to the seat cushion portion 102.

The control CCA 604 comprises the control system of the bladder system 106 and is shown to include, among other components, an inflation controller 606 (e.g., a microprocessor), a pressure sensor 608, an audible indicator 610, and a firmness controller 612. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

The control CCA 604 is shown to receive multiple signals for processing, including a presence sensor input signal 642 and a firmness selection input signal 644. The presence sensor input signal 642 may be generated by the presence sensor assembly 414, as described above with reference to FIG. 4. When a user sits on the seat cushion portion 102, the presence sensor input signal 642 generated by the presence sensor assembly 414 causes the inflation controller 606 to sequentially inflate and deflate the bladders 406, 408, as described below with reference to FIG. 7. When the user stands up, the presence sensor input signal 642 is interrupted or otherwise indicates that the user is no longer present, causing the inflation controller 606 to arrest the inflation and deflation of the bladders 406, 408.

The firmness selection input signal 644 may be generated by the firmness actuation button 114 or 124, depending on the installation location of the control assembly 122. As described above, in an exemplary implementation, the firmness actuation button 114, 124 may be utilized to toggle between a soft, medium, or hard firmness level. The firmness levels are each associated with a bladder inflation pressure that is supplied by the bladder pump 616. The bladder inflation pressures may be stored in memory of the firmness controller 612. For example, the soft firmness level may be associated with a bladder inflation pressure of 1.4 psi, the medium firmness level may be associated with a bladder inflation pressure of 1.8 psi, and the hard firmness level may be associated with a bladder inflation pressure of 2.2 psi. The firmness controller 612 may also be configured to store the user's selection of the firmness level, and to command the audible indicator 610 to emit indicator sounds based on the stored selection when prompted via actuation of the firmness actuation button 114 or 124. As described above, when a user initially pushes the firmness actuation button 114 or 124 once, the button 114 or 124 will generate a firmness selection input signal 644 that prompts the firmness controller 612 to retrieve the user's previously stored firmness selection (e.g., medium level firmness) and to command the audible indicator 610 based on that stored selection (e.g., emitting two beeps). If the user subsequently pushes the firmness actuation button 114 or 124, the button 114 or 124 will generate a firmness selection input signal 644 that prompts the firmness controller 612 to update the user's stored firmness selection (e.g., from medium level firmness to hard level firmness) and to command the audible indicator 610 based on the updated selection (e.g., emitting three beeps).

The bladder pump 616 may be any suitable electric motor air pump. It is communicatively connected to the inflation controller 606 and operatively coupled to an outlet tube 618, which, upon passing through a directing valve 624 supplies air to the bladders 406, 408. In an exemplary implementation, the bladder pump 616 is a non-pulsating pump in order to ensure that accurate pressure values are sensed by the pressure sensor 608. In an exemplary implementation, the pump 616 is not supplied with the full power available from the DC plug connector 120. For example, for a standard 12 V power supply, the pump power setting may be 80% of the maximum supply, such that only 9.6 V is supplied to the bladder pump 616. By limiting the power supplied to the bladder pump 616 in this way, the pump motor does not operate at its maximum speed, and the present inventor has recognized that this results in slower and more accurate inflation of the bladders 406, 408. Accuracy of the inflation pressure supplied by the bladder pump 616 is confirmed via sensor measurements continuously collected by the pressure sensor 608. As described in further detail below with reference to FIG. 7, if the pressure sensor 608 detects the pressure supplied by the bladder pump 616 does not meet expected values, the inflation controller 606 may act to arrest the operation of the bladder pump 616 and to generate an audible pressure alarm using the audible indicator 610. In some implementations, rather than a dedicated bladder pump, the bladders 406, 408 may be inflated by an air ride seat compressor that incorporates a regulator.

The control assembly 122 is further shown to include multiple valves, including a relief valve 620, a directing valve 624, a ischial bladders valve 630, and a sacral bladder valve 632. A person of ordinary skill in the art will understand in view of the present disclosure that other valve arrangements could be implemented and are within the scope of the present disclosure, and that the valve functions described herein may be combined or divided into a different number of operatively coupled devices.

The relief valve 620 is shown to be operatively coupled to the outlet tube 618 of the bladder pump 616. The relief valve 620 is a mechanical valve that is configured to automatically open to a vent passage 622 when the pressure exceeds a predetermined breakpoint pressure value (e.g., 2.8 psi). In the event of a failure of the relief valve 620 such that the pressure sensor 608 senses a pressure above a threshold pressure (e.g., 4.0 psi), the inflation controller 606 may command the audible indicator 610 to emit a high pressure alarm indication. The high pressure alarm indication may prompt a user to cut the power to the bladder system 106, either by disconnecting the DC plug connector 120 from its socket, or by actuating a master power switch.

In an exemplary implementation, the directing valve 624, the ischial bladders valve 630, and the sacral bladder valve 632 are solenoid valves configured to control the supply of air to and from the bladders 406, 408. The directing valve 624 is a three-way valve that receives air from the outlet tube 618 and, depending on control signals received from the inflation controller 606, operates to direct the air through either the ischial bladders connecting hose 626 or the sacral bladder connecting hose 628. Each of the connecting hoses 626, 628 is shown to respectively terminate in a connector 638, 640 that operates to couple the ischial bladders connecting hose 626 with the ischial bladders air hose 410 (depicted in FIG. 4) and the sacral bladder connecting hose 628 with the sacral bladder air hose 412 (see also depicted in FIG. 4) to inflate the bladders 406, 408. During deflation of one or more of the bladders 406, 408, the inflation controller 606 operates the ischial bladders valve 630 and/or the sacral bladder valve 632 to open to respective vent passages 634, 636, thus permitting air that is stored in the bladders 406, 408 to flow out of the bladders, though the air hoses 410, 412 and connecting hoses 626, 628 and out through the vent passages 634, 636.

Figure 7:
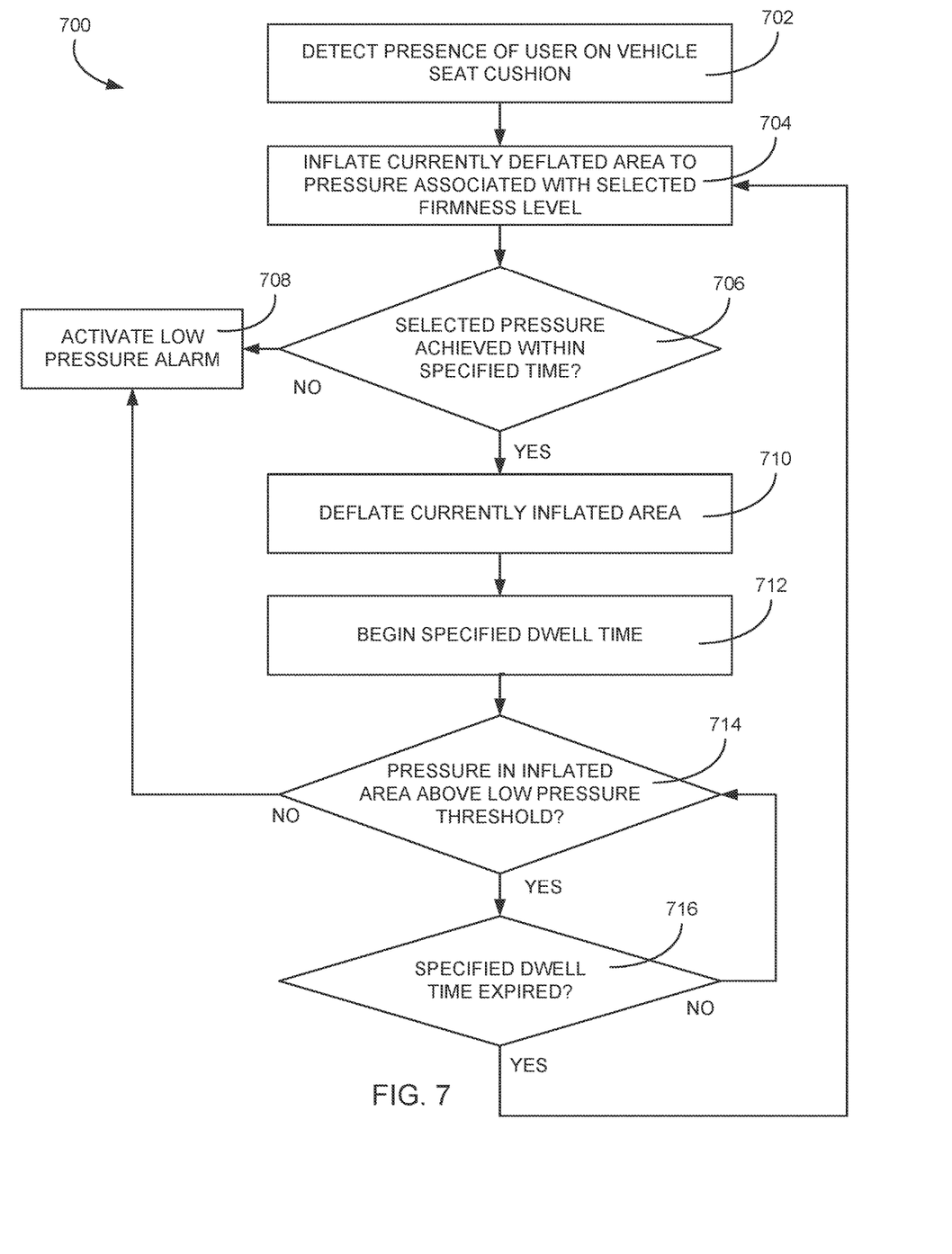
FIG. 7 is a flow chart of a process for sequentially inflating and deflating the bladders of the bladder system of FIG. 4.

Referring now to FIG. 7, a process 700 for sequentially inflating and deflating the bladders 406, 408 of the bladder system 106 is depicted. The present inventor has recognized that inflating one or more of the bladders to a static pressure while the user is sitting does not result in relief of the problems caused by capillary occlusion due to sitting. However, the present inventor has further recognized that by cycling the bladders 406, 408 through periods of inflation and deflation, the pressures on tissues caused by sitting is continuously varied, and pain and damage due to capillary occlusion is avoided. In an exemplary implementation, process 700 is performed at least in part by the control CCA 604 and particularly the inflation controller 606, depicted and described above with reference to FIG. 6.

Process 700 commences with step 702 as the inflation controller 606 detects the presence of a user sitting on the seat cushion portion 102. This detection may occur when the presence sensor assembly 414 (see FIG. 4) generates a presence sensor input signal 642 that is received at the control CCA 604 by the inflation controller 606. At step 704, the inflation controller 606 commands the bladder pump 616 to inflate a currently deflated area (e.g., either the ischial bladders 406 or the sacral bladder 408) to the pressure associated with the user's selected firmness level that is stored in the firmness controller 612. For example, if the user has selected a medium firmness level, the inflation controller 606 may operate the directing valve 624 to open the valve passage to operably connect with the ischial bladders connecting hose 626 and operate the bladder pump 606 to provide a bladder pressure of 1.8 psi.

At step 706, the inflation controller 606 determines whether the pressure associated with the user-selected firmness level has been achieved within a predetermined time period (e.g., 60 seconds). This determination is based on pressure measurements sensed by the pressure sensor 608 at the input side of the directing valve 624. If, at step 706, the inflation controller 606 determines that the pressure has not reached the target pressure within a certain specified tolerance (e.g., 0.2 psi), process 700 proceeds to step 708 and the inflation controller 606 directs the audible indicator 610 to emit a low pressure alarm. The low pressure alarm indication may prompt a user to cut the power to the bladder system 106, either by disconnecting the DC plug connector 120 from its socket, or by actuating a master power switch.

However, returning to step 706, if the inflation controller 606 determines that the pressure supplied by the bladder pump 616 has reached the target pressure within the predetermined time period, process 700 proceeds to step 710 and the inflation controller 606 acts to deflate a currently inflated bladder or bladders. For example, if the inflation controller 606 has operated the directing valve 624 to inflate the ischial bladders 406 at step 706, during step 710, the inflation controller 610 will command the sacral bladder valve 632 to open and vent air stored within the sacral bladder 408 via the vent passage 636. In some implementations, the inflation controller 606 is only configured to open the valve 630 or 632 associated with the deflating bladder or bladders 406, 408 for a specified period of time (e.g., 20 seconds) before closing the valve 630 or 632.

At step 712, the inflation controller 606 begins a predetermined dwell period (e.g., 1 minute and 40 seconds). This dwell period may be configurable by a user based on how frequently the user would like the inflation and deflation cycles of the bladders 406, 408 to occur. In an exemplary implementation, the user can modify the dwell period by coupling the control assembly 122 to an external computing system (not shown) via a wired or wireless connection. At step 714, the inflation controller 606 determines whether the pressure as sensed by the pressure sensor 608 at the input side of the directing valve 624 has dropped below a low pressure threshold (e.g., 0.2 psi below the target pressure). If the inflation controller 606 determines that the pressure has dropped below this low pressure threshold, process 700 proceeds to step 708 and the inflation controller 606 directs the audible indicator 610 to emit a low pressure alarm. The low pressure alarm indication may prompt a user to cut the power to the bladder system 106, either by disconnecting the DC plug connector 120 from its socket, or by actuating a master power switch.

However, if the pressure as sensed by the pressure sensor 608 remains above the low pressure threshold, process 700 advances to step 716 and the inflation controller 606 determines whether the predetermined dwell period has expired. If the dwell period has not expired, process 700 reverts to step 714, and the inflation controller 606 again determines whether pressure in the inflated bladder or bladders remains above the low pressure threshold. During the dwell time period, steps 714 and 716 may be performed as dictated by the sampling rate of the pressure sensor 608 (e.g., one measurement per second, thus steps 714 and 716 are performed approximately once every second).

When the inflation controller 606 determines that the dwell period has expired at step 716, process 700 reverts to step 704, and one or more of the bladder or bladders that are currently deflated are commanded to be inflated through operation of the bladder pump 616 and the directing valve 624. For example, if the first iteration of the process 700 resulted in inflation of the ischial bladders 406 and deflation of the sacral bladder 408, the next iteration of the process 700 will result in inflation of the sacral bladder 408 at step 704, and deflation of the ischial bladders 406 at step 710. Process 700 may continue to iterate so long as the presence sensor input signal 642 indicates that a user is seated on the seat cushion portion 102.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A vehicle seat assembly, comprising:
  a plurality of inflatable bladders embedded below a seating surface of a seat cushion portion of the vehicle seat assembly, the plurality of inflatable bladders comprising at least a first group of inflatable bladders and a second group of inflatable bladders, wherein the first group of inflatable bladders comprises at least one ischial bladder positioned to support an ischial region of a user's spine while the user is seated on the seat cushion portion, and wherein the second group of inflatable bladders comprises at least one central bladder positioned to support a central region of the user's spine while the user is seated on the seat cushion portion;

a control system operably coupled to the plurality of inflatable bladders and contained within an enclosure that is strapped to a structural frame of the vehicle seat assembly and located to the rear of the seat cushion portion of the vehicle seat assembly, wherein the control system is configured to:

operate a bladder pump to inflate the first group of inflatable bladders to a target pressure;

operate a valve coupled to the second group of inflatable bladders to deflate the second group of inflatable bladders; and upon expiration of a dwell period of at least one minute during which both the first and second groups of inflatable bladders are neither inflating nor deflating, operate the bladder pump to inflate the second group of inflatable bladders to the target pressure and operate a valve coupled to the first group of inflatable bladders to deflate the first group of inflatable bladders.

2. The vehicle seat assembly of claim 1, wherein the control system is further configured to:

detect a presence of a user seated on the seat cushion portion; and responsive to detection of the presence of the user seated on the seat cushion portion, operate the bladder pump to inflate the first group of inflatable bladders to a target pressure.

3. The vehicle seat assembly of claim 1, wherein each of the valve coupled to the first group of inflatable bladders and the valve coupled to the second group of inflatable bladders is a solenoid valve.

4. The vehicle seat assembly of claim 1, wherein the control system is further configured to receive a firmness selection level from an actuating device, wherein the target pressure is based on the firmness selection level.

5. The vehicle seat assembly of claim 4, wherein the actuating device comprises a button embedded within the seat cushion portion.

6. The vehicle seat assembly of claim 4, wherein the actuating device comprises a button mounted to an exterior surface of an arm rest portion of the vehicle seat assembly using a mounting bracket.

7. The vehicle seat assembly of claim 4, wherein the firmness selection level is selected from a group comprising a soft firmness level, a medium firmness level, and a hard firmness level.

8. The vehicle seat assembly of claim 1, wherein the control system is further configured to:

detect whether a measured pressure in either the first group of inflatable bladders or the second group of inflatable bladders does not meet a low pressure threshold; and responsive to detection that the measured pressure does not meet the low pressure threshold, activate an alarm.

9. The vehicle seat assembly of claim 1, wherein the dwell period is configurable by a user.

10. A method of operating a vehicle seat assembly, comprising:

providing a plurality of inflatable bladders embedded below a seating surface of a seat cushion portion of the vehicle seat assembly, the plurality of inflatable bladders comprising at least a first group of inflatable bladders and a second group of inflatable bladders, wherein the first group of inflatable bladders comprises at least one ischial bladder positioned to support an ischial region of a user's spine while the user is seated on the seat cushion portion, and wherein the second group of inflatable bladders comprises at least one central bladder positioned to support a central region of the user's spine while the user is seated on the seat cushion portion;

operating a bladder pump to inflate the first group of inflatable bladders to a target pressure using a control system, wherein the control system is contained within an enclosure, and wherein the enclosure is strapped to a structural frame of the vehicle seat assembly and located to the rear of the seat cushion portion of the vehicle seat assembly;

operating a valve coupled to the second group of inflatable bladders to deflate the second group of inflatable bladders using the control system; and upon expiration of a dwell period of at least one minute during which both the first and second groups of inflatable bladders are neither inflating nor deflating, operating the bladder pump to inflate the second group of inflatable bladders to the target pressure and operating a valve coupled to the first group of inflatable bladders to deflate the first group of inflatable bladders using the control system.

11. The method of claim 10, wherein the method further comprises:

detecting a presence of a user seated on the seat cushion portion; and responsive to detection of the presence of the user seated on the seat cushion portion, operating the bladder pump to inflate the first group of inflatable bladders to a target pressure.

12. The method of claim 10, wherein the method further comprises:

receiving a firmness selection level from an actuating device, wherein the target pressure is based on the firmness selection level.

13. The method of claim 10, wherein the method further comprises:

detecting whether a measured pressure in either the first group of inflatable bladders or the second group of inflatable bladders does not meet a low pressure threshold; and responsive to detection that the measured pressure does not meet the low pressure threshold, activating an alarm.

* * * * *